(12) United States Patent
Kitamura et al.

(10) Patent No.: US 7,901,499 B2
(45) Date of Patent: Mar. 8, 2011

(54) INK COMPOSITION

(75) Inventors: Kazuhiko Kitamura, Matsumoto (JP); Akihito Sao, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 102 days.

(21) Appl. No.: 12/074,816

(22) Filed: Mar. 5, 2008

(65) Prior Publication Data

US 2009/0047484 A1 Feb. 19, 2009

(30) Foreign Application Priority Data

Mar. 5, 2007 (JP) ................................. 2007-054385

(51) Int. Cl.
*C09D 11/02* (2006.01)
(52) U.S. Cl. .................................. 106/31.58; 106/31.86
(58) Field of Classification Search ............... 106/31.58, 106/31.86
See application file for complete search history.

(56) References Cited

U.S. PATENT DOCUMENTS

| | | | |
|---|---|---|---|
| 5,969,005 A | 10/1999 | Yamashita et al. | |
| 7,048,789 B2 * | 5/2006 | Taguchi et al. | ............ 106/31.43 |
| 2002/0107303 A1 * | 8/2002 | Miyabashi et al. | ............ 523/160 |
| 2002/0198287 A1 * | 12/2002 | Ohta et al. | ............... 523/160 |
| 2007/0146454 A1 * | 6/2007 | Doi et al. | ................. 347/100 |
| 2008/0018720 A1 * | 1/2008 | Fukushima et al. | ............ 347/86 |

FOREIGN PATENT DOCUMENTS

| | | |
|---|---|---|
| JP | 09-003374 | 1/1997 |
| JP | 2696841 | 9/1997 |
| JP | 10-17803 | 1/1998 |
| JP | 2874691 | 1/1999 |
| JP | 2001-187895 | 7/2001 |
| JP | 2004-263155 | 9/2004 |
| JP | 2005-47988 | 2/2005 |

* cited by examiner

*Primary Examiner* — Jerry Lorengo
*Assistant Examiner* — Veronica Faison Gee
(74) *Attorney, Agent, or Firm* — Nutter McClennen & Fish LLP; John J. Penny, Jr.

(57) ABSTRACT

An ink composition at least comprising water and a colorant, and further comprising 0.01% by weight or more of lithium ions based on the total weight of the ink composition, wherein at least one type of glycol ether represented by the following formula 1 is contained:

$$R_1O-[-CH_2-CH_2-O]_n-R_2 \quad \text{Formula 1}$$

(wherein, n represents a positive number of 4 to 8, $R_1$ represents H or an alkyl group having 1 to 3 carbon atoms, and $R_2$ represents an alkyl group having 6 to 8 carbon atoms).

15 Claims, 1 Drawing Sheet

INK COMPOSITION

This application claims priority from Japanese Patent Application No. 2007-054385, filed on Mar. 5, 2007, the contents of which are incorporated herein.

BACKGROUND

1. Technical Field

The present invention relates to an ink composition, comprising a prescribed concentration or more of lithium ions, capable of ensuring superior printing quality by preventing clogging and the like as a result of preventing or inhibiting the precipitation of insoluble or poorly soluble salts in water/organic solvent occurring due to highly fatty acids and salts thereof contained in a plastic container or member such as an ink cartridge when the ink composition has contacted the plastic container or member.

2. Related Art

Inkjet recording is a method for recording letters or images (to also be simply referred to as "images") on the surface of a recording medium by discharging an ink composition from a micronozzle in the form of small droplets. Examples of practical inkjet recording methods include a method in which letters and images are recorded onto the surface of a recording medium by converting an electrical signal to a mechanical signal using a piezoelectric device and intermittently discharging an ink composition stored in a nozzle head portion, and a method in which letters and images are recording onto the surface of a recording medium by generating bubbles by rapidly heating a portion closest to a discharge portion and intermittently discharging an ink composition stored in a nozzle head portion utilizing the volumetric expansion generated by the bubbles.

In addition, although ink compositions for inkjet recording typically have various types of dyes dissolved in water, organic solvent or mixture thereof in consideration of safety and printing characteristics, stricter conditions are required with respect to various characteristics as compared with ink compositions for writing instruments in the manner of fountain pens and ballpoint pens.

In recent years in particular, inkjet printers have come to be employed to produce printed articles for advertising, and even stricter requirements are applicable when forming color images using a plurality of ink compositions. In addition to ink compositions used to form color images being required to have satisfactory color development, they are also required to have basic characteristics such as the absence of bronzing when printing onto glossy paper and the absence of discoloration and fading during subsequent storage of printed articles. In addition, since printed articles may be placed both indoors and outdoors, they are exposed not only to sunlight but also various light and outside air (such as ozone, nitrogen oxides and sulfur oxides), and ink compositions have been developed that have superior light resistance and gas resistance. These characteristics are heavily dependent on the compound used for the colorant.

However, since the water solubility of the colorant itself tends to be low in ink compositions having superior light resistance and gas resistance, not only is it difficult to obtain stable discharge properties, but particularly in the case cyan-based ink compositions, there is the problem of increased susceptibility to the occurrence of bronzing on glossy paper.

In addition, ink compositions tend to use easily handled aqueous vehicles, and lithium salts are used to maintain solubility in aqueous vehicles of various organic additives including colorants. More specifically, although lithium ions are used for the counter ions of the colorant, the use of a lithium salt is known to enhance water solubility of the colorant and increase resistance to the occurrence of bronzing on recorded articles (glossy paper) in cyan-based colorants. In addition, the use of lithium salts of compounds having a carboxyl group on a naphthalene backbone (such as 2-naphtoeic acid or 6-hydroxy-2-naphthoeic acid) is also known to be able to inhibit bronzing of cyan-based ink compositions (see, for example, JP-A-2004-263155). In any case, however, this results in an increased lithium ion concentration in the ink composition.

On the other hand, an ink composition for inkjet recording is filled into an ink cartridge having an ink housing chamber, and is used by installing in a printer. Various types of plastics are frequently used for the members that compose this ink cartridge because of their ease of processing and low cost. Although numerous additives are typically used in plastics, higher fatty acids in particular as exemplified by stearic acid are contained for use as lubricants. When these higher fatty acids bond with metal (such as K, Na or Li), a salt is frequently formed that is insoluble or poorly soluble in water or organic solvent. Consequently, there are cases in which higher fatty acids elute into the ink composition from plastic that has contacted the ink composition, these fatty acids then bond with metal in the ink composition thereby resulting in the precipitation of salts that are insoluble or poorly soluble in water and organic solvents over time, and eventually causing clogging and the like.

The inventors of the present invention confirmed that in the case the metal is lithium, salts that are insoluble or poorly soluble in water and organic solvents are formed to an even greater extent than in the case of other monovalent metal salts (such as sodium salts or potassium salts).

Namely, in the case of filling an ink composition containing a large amount of lithium ions as described above into the above-mentioned ink cartridge, when the lithium ions in the ink composition exceed a certain fixed concentration, lithium salts of fatty acids that are insoluble or poorly soluble in water and organic solvents precipitate over time, thereby causing problems such as clogging.

With respect to the above-mentioned problems, an inkjet recording apparatus is provided that defines the contents of fatty acids and/or fatty acid derivatives in the material of an ink tank that contacts an ink (see Japanese Patent No. 2874691). Alternatively, an inkjet recording apparatus is proposed that defines sodium ion concentration in an ink that contacts an ink tank containing a fatty acid and/or fatty acid derivative (see Japanese Patent No. 2696841). In addition, an aqueous ink that defines the fatty acid content in the ink and an inkjet recording method that uses that ink are proposed (see JP-A-9-3374).

However, in each of these examples of the prior art, the precipitation of fatty acid lithium salts that are insoluble or poorly soluble in water and organic solvents when using a colorant having various superior characteristics as described above is unable to be adequate prevented, thereby having the problem of being unable to realize both high printing quality such as that free of bronzing or storageablity of printed articles in the form of light resistance, gas resistance and the like, and prevention of printer clogging and the like during long-term storage while in contact with a plastic container or plastic member.

SUMMARY

In order to solve the above-mentioned problems, the present invention provides an ink composition that prevents problems such as clogging caused by precipitation of fatty acid salts insoluble or poorly soluble in water and organic solvents occurring due to contact between the ink composition and a member such as an ink cartridge.

In order to solve the above-mentioned problems, the present applicant previously proposed an ink composition demonstrating the effect of preventing clogging caused by insoluble or poorly soluble lithium salts by incorporating a 1,2-alkanediol or compound represented by formula 2 in an ink composition containing a specific concentration of lithium ions (see JP-A-2005-47988).

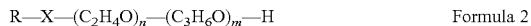

$$R—X—(C_2H_4O)_n—(C_3H_6O)_m—H \quad \text{Formula 2}$$

(wherein, R represents an alkyl group or cycloalkyl group having 4 to 20 carbon atoms, X represents —O—, —COO— or —NH—, m and n respectively and independently represent an integer of 0 to less than 20, and m+n is from 1 to less than 30).

As a result of further conducting extensive studies on the previously proposed ink composition, although the inventors of the present invention used a 1,2-alkanediol or a compound represented by formula 2 as described above to dissolve higher fatty acid salts in the invention of the prior application, it was found that that the use of a specific glycol ether represented by a specific chemical formula that is completely different from these compounds demonstrates greater effectiveness than the invention of the prior application.

The present invention is based on the above-mentioned finding, and more specifically, employs the configuration described below:

(1) an ink composition at least comprising water and a colorant and further comprising 0.01% by weight or more of lithium ions based on the total weight of the ink composition, wherein at least one type of glycol ether represented by the following formula 1 is contained:

$$R_1O—[—CH_2—CH_2—O]_n—R_2 \quad \text{Formula 1}$$

(wherein, n represents a positive number of 4 to 8, $R_1$ represents H or an alkyl group having 1 to 3 carbon atoms, and $R_2$ represents an alkyl group having 6 to 8 carbon atoms);

(2) the ink composition described in (1) above, wherein the weight ratio of lithium ions to the glycol ether represented by formula 1 is 1:10 to 1:30;

(3) the ink composition described in (1) above, wherein the weight ratio of lithium ions to the glycol ether represented by formula 1 is 1:15 to 1:30;

(4) the ink composition described in any of (1) to (3) above, wherein the glycol ether represented by formula 1 is such that in formula 1, $R_2$ represents an alkyl group having eight carbon atoms;

(5) the ink composition described in any of (1) to (4) above, wherein the glycol ether represented by formula 1 is tetraethylene glycol mono-2-ethyl hexyl ether, hexaethylene glycol mono-2-ethyl hexyl ether or octaethylene glycol mono-2-ethyl hexyl ether;

(6) the ink composition described in any of (1) to (5) above, wherein the content of the glycol ether represented by formula 1 is 0.2 to 10% by weight of the entire ink composition;

(7) the ink composition described in (6) above, wherein the content of the glycol ether is 0.2 to 6% by weight;

(8) the ink composition described in any of (1) to (7) above, further containing a glycol ether other than the glycol ether represented by formula 1;

(9) the ink composition described in any of (1) to (8) above, wherein the total content of glycol ether is 6 to 15% by weight of the entire ink composition;

(10) the ink composition described in (8) or (9) above, wherein the content of the glycol ether represented by formula 1 is 5 to 40% by weight of all glycol ethers;

(11) the ink composition described in any of (1) to (10) above, which is used in an inkjet recording method;

(12) the ink composition described in (11) above, wherein the inkjet recording method is a recording method that uses an inkjet head that forms ink droplets by mechanical deformation by a piezoelectric device;

(13) an ink cartridge, housing the ink composition described in (1) to (11) above either independently or integrally;

(14) an inkjet recording method for carrying out recording by discharging droplets of an ink composition and adhering the droplets to a recording medium; wherein, the ink composition described in any of (1) to (12) above is used for the ink composition; and

(15) a recorded article recorded using the ink composition described in any of (1) to (12) above, or recorded according to the recording method described in (14) above.

Furthermore, in the present invention, the weight of the lithium ions refers to the value of weight obtained by converting the lithium ions to metal, and not the weight of the lithium ions.

As a result of employing the configuration described above, the present invention is able to prevent or inhibit the precipitation of insoluble or poorly soluble foreign substances caused by contact with an ink contact member such as a plastic ink cartridge or ink tank by incorporating a small amount of a specific glycol ether represented by formula 1 even if in the case of an ink composition containing a larger amount of lithium ions than that previously proposed, thereby being able to demonstrate the effect of improving clogging characteristics.

In addition, according to the ink composition of the present invention, the precipitation of lithium salts of higher fatty acids confirmed in ink compositions having a lithium ion level of less than 210 ppm can be effectively prevented or inhibited, thereby making it possible to ensure further improvement of printed image quality.

DESCRIPTION OF EXEMPLARY EMBODIMENTS

Figure 1:
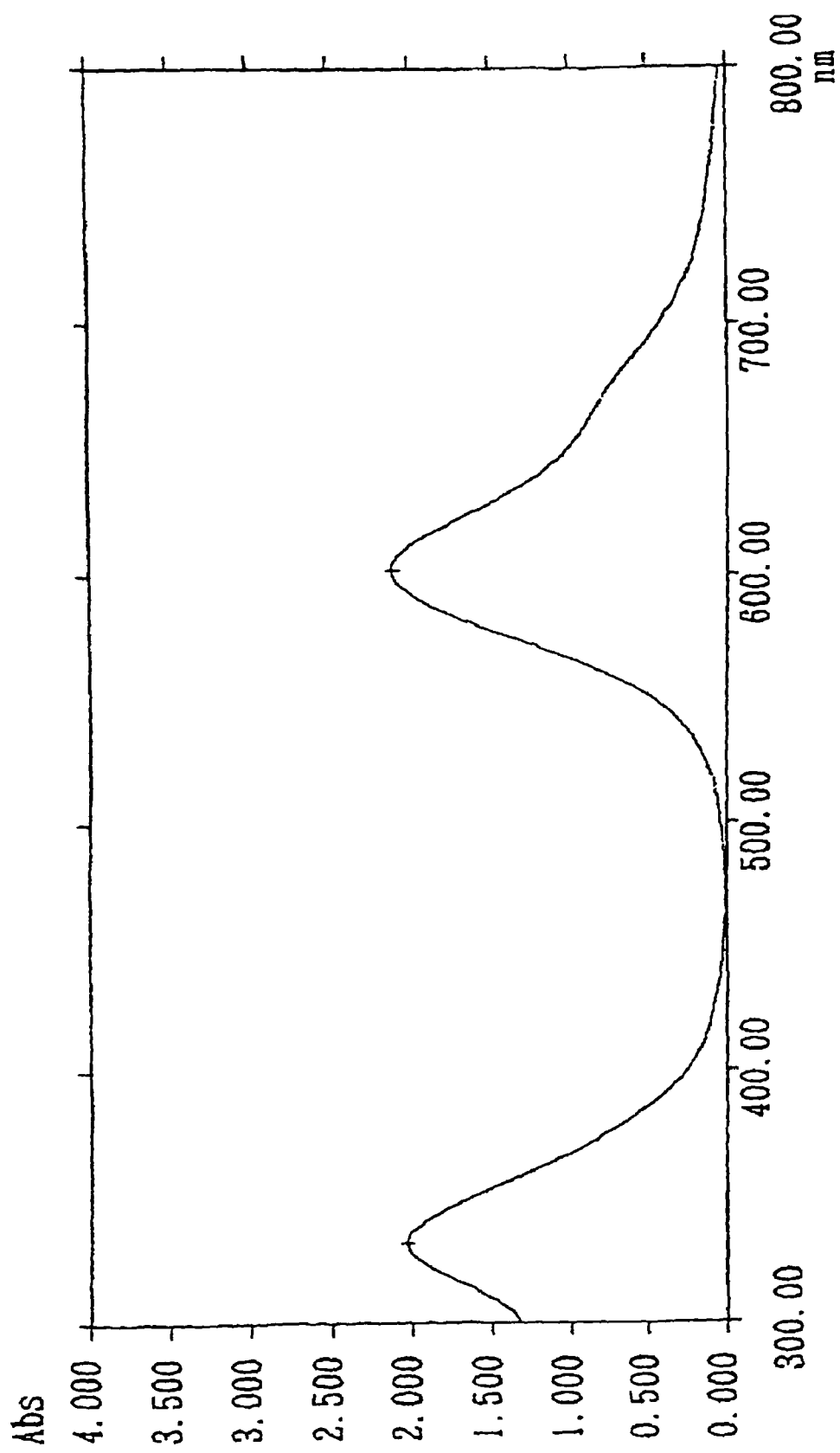
FIG. 1 is a graph showing the spectral characteristics (absorption wavelength) of a dye (C. I. Direct Blue 199) used in the examples and comparative examples.

The ink composition as claimed in the present invention is effective in the case of containing lithium ions at 0.01% by weight or more based on the total weight of the ink composition. Among ink compositions that have extended the life of image quality by tens of years, although obviously true in the case of containing lithium ions at high concentrations, even in cases of containing lithium ions at low concentrations to this extent, if housed in a plastic ink cartridge or ink tank and the like containing a lubricant in the form of a higher fatty acid such as stearic acid, higher fatty acid lithium salts insoluble or poorly soluble in water and organic solvents precipitate as the higher fatty acid elutes into the ink composition time due to contact between the ink composition and the plastic members indicated above, thereby forming a foreign substance that causes such problems as clogging during printing or leading to a decrease in image quality even if printing is able to be carried out without the occurrence of clogging.

Examples of materials of the ink contact members described above include resins such as polyolefin resin, polyvinyl chloride, polyvinylidene chloride, silicone resin, ethylene-vinyl acetate copolymer, ABS resin, polyacetal (polyoxymethylene), Nylon, unsaturated polyester resin, PET or aramid resin, and synthetic rubber such as styrene butadiene rubber (SBR), butadiene rubber, chloroprene, nitrile rubber, butyl rubber, EPDM, urethane rubber, silicone rubber, acrylic rubber, epichlorhydrin rubber or fluorine rubber.

These members typically contain higher fatty acids as previously described. Higher fatty acids having 8 to 22 carbon atoms are used typically, examples of which include one or two or more types selected from the group consisting of stearic acid and salts thereof, stearic amide, ethylenebis-stearic acid and salts thereof, ethylenebis-stearic amide, behenic acid and salts thereof, behenic acid amide, oleic acid and salts thereof, oleic amide, erucic acid and salts thereof and erucic amide.

The ink composition of the present invention is particularly preferable in the case of being supplied, stored or used by housing in an ink cartridge or ink tank and the like composed of a member for which there is a large amount of elution of higher fatty acid into the ink from an ink contact member.

The ink composition of the present invention contains the glycol ether represented by formula 1 as a component for solubilizing the above-mentioned higher fatty acid lithium salts.

In formula 1, affinity for higher fatty acid salts can be enhanced by making $R_2$ to be an alkyl group having 6 to 8 carbon atoms, and the water solubility of the glycol ether can be enhanced and an adequate added amount can be ensured by making the value of n to be 4 to 8.

In addition, if $R_1$ is an alkyl group having 1 to 3 carbon atoms, the above-mentioned higher fatty acid lithium salts can be adequately dissolved without decreasing image quality.

The glycol ether represented by formula 1 is particularly useful for preventing or inhibiting precipitation as a result of that in which the number of carbons of $R_2$ is 8 having a high affinity for higher fatty acid lithium salts and demonstrating high stabilization effects in ink. In the present invention, tetraethylene glycol mono-2-ethyl hexyl ether, hexaethylene glycol mono-2-ethyl hexyl ether or octadecylethylene glycol mono-2-ethyl hexyl ether is particularly preferable.

The weight ratio of lithium ions to the glycol ether represented by formula 1 in the ink composition is preferably 1:10 to 1:30, and more preferably 1:15 to 1:30 from the viewpoint of improving the ability to dissolve fatty acid lithium salts.

If the glycol ether represented by formula 1 is within the above-mentioned range with respect to lithium ions, precipitation of higher fatty acid lithium salts can be adequately prevented and problems with ink discharge such as clogging can be effectively prevented, thereby making it possible to improve discharge stability and obtain high image quality (by resulting in favorable bleeding, rapid-drying and the like).

Although the glycol ether represented by formula 1 also has the action of an ink penetration promoter, in the present invention, at least one type of penetration promoter in the form of a glycol ether other than a glycol ether represented by formula 1 is preferably incorporated together with the glycol ether represented by formula 1.

The addition of this penetration promoter in the form of a glycol ether improves penetration of the ink composition of the present invention without impairing liquid contactability (referring to the attack on various members and adhesives contacted by the ink composition in the printer, although dissolution or cracking of members or peeling accompanying dissolution of adhesive may occur if this attack becomes excessively strong), while also reducing bleeding at the boundaries between adjacent color inks in the case of color printing, improving rapid drying, and allowing the obtaining of extremely sharp images. On the other hand, although an ink composition containing only a glycol ether other than the glycol ether represented by formula 1 has some ability to dissolve higher fatty acid lithium salts, the superior dissolving ability of the ink composition of the present invention cannot be obtained. Thus, the ink composition of the present invention preferably contains both of these components.

The glycol ether represented by formula 1 is contained within the range of 0.2 to 10% by weight, preferably within the range of 0.2 to 6% by weight, and more preferably within the range of 1 to 5% by weight in the entire ink composition, and is preferably contained within the range of 5 to 40% by weight of all glycol ethers.

The content of all glycol ethers is preferably 6 to 15% by weight, and particularly preferably 7 to 12% by weight, in the entire ink composition.

Various colorants can be used for the colorant of the ink composition of the present invention within a range that does not significantly impair light resistance, gas resistance and the like, and dyes or pigments used in ordinary inks, and particularly inkjet recording, can be used.

Examples of dyes that can be used include direct dyes, acidic dyes, food dyes, basic dyes, disperse dyes, vat dyes, soluble vat dyes and reactive dyes. In addition, examples of pigments that can be used include organic pigments and inorganic pigments.

One type of the above-mentioned colorants, or two or more types as a mixture, can be used in the ink composition used in the present invention. In addition, the content of the colorant is preferably 0.5 to 12% by weight, and more preferably 1.0 to 10% by weight, based on the total weight of the ink composition.

Moreover, the present invention is effective in the case of having lithium ions as the counter ions of the colorant.

The ink composition of the present invention preferably uses water or a mixture of water and a water-soluble organic vehicle as a main vehicle.

Examples of water that can be used include ion exchange water, ultrafiltered water, reverse osmosed water and distilled water. In addition, water subjected to various types of chemical sterilization treatment such as ultraviolet irradiation or addition of hydrogen peroxide is preferable from the viewpoint of long-term storage.

In the ink composition of the present invention, the content of water in the case of being used as a main vehicle is preferably 40 to 90% by weight, and more preferably 50 to 80% by weight, based on the total weight of the ink composition.

The ink composition of the present invention can contain a moisture retention agent selected from the group consisting of water-soluble organic solvents and/or sugars having a vapor pressure lower than that of pure water. The containing of a moisture retention agent enables the ink to retain moisture by inhibiting the evaporation of moisture in the inkjet recording process. In addition, the use of a water-soluble organic solvent improves discharge stability or facilitates changes in viscosity without changing ink characteristics.

A water-soluble organic solvent refers to a vehicle having the ability to dissolve a solute, and is selected from water-soluble vehicles that are organic and have a vapor pressure lower than water, specific examples of which include polyvalent alcohols such as propylene glycol, butanediol, pentanediol, 2-butene-1,4-diol, 2-methyl-2,4-pentanediol, 1,2,6-hexanetriol, diethylene glycol, triethylene glycol or dipropylene glycol, alkyl alcohols such as methyl alcohol, ethyl alcohol, n-propylene alcohol or n-butyl alcohol, ketones such as acetonyl acetone, esters such as γ-butyrolactone or triethyl phosphate, and furfuryl alcohol, tetrahydrofurfuryl alcohol, thiodiglycol and glycerin.

In addition, examples of sugars include maltitol, sorbitol, gluconolactone and maltose.

The above-mentioned moisture retention agents are preferably added at 5 to 50% by weight, more preferably at 5 to 30% by weight, and even more preferably at 5 to 20% by weight, based on the total weight of the ink composition. If the amount added is 5% by weight or more, moisture retention is obtained, while if the amount added is 50% by weight or less, the ink composition is easily adjusted to the viscosity used for inkjet recording.

Moreover, the ink composition of the present invention preferably contains a nonionic surfactant as an additive effective for obtaining rapid ink fixation (penetration) while at the same time maintaining the roundness of individual dots.

Examples of the above-mentioned nonionic surfactant include acetylene glycol-based surfactants. Although specific examples of acetylene glycol-based surfactants include 2,4,7,9-tetramethyl-5-decene-4,7-diol, 3,6-dimethyl-4-octyne-3,6-diol and 3,5-dimethyl-1-hexen-3-ol, commercially available products such as Saffinol 104, 82, 465, 485 or TG manufactured by Air Products Japan, Inc., or Olefin STG or Olefin E1010 manufactured by Nissin Chemical Industry Co., Ltd., can also be used. Since adequate penetration is unable to be obtained if the added amount is too low, while image bleeding occurs easily if the added amount is too high, the added amount thereof is 0.1 to 5% by weight and preferably 0.5 to 2% by weight.

In addition, an additive such as a pH adjuster, dissolution assistant, antioxidant, water-soluble polymer such as sodium arginate, water-soluble resin, fluorine-based surfactant, preservative, antifungal agent or rust inhibitor can be added as necessary to the ink composition of the present invention.

Examples of pH adjusters, dissolution assistants and antioxidants include amines and degradation products thereof such as diethanolamine, triethanolamine, propanolamine or morpholine, metal hydroxides such as potassium hydroxide, sodium hydroxide or lithium hydroxide, ammonium salts such as ammonium hydroxide or quaternary ammonium hydroxides (such as tetramethylammonium), carbonates and phosphates such as potassium carbonate, sodium carbonate or lithium carbonate, pyrrolidones such as N-methyl-2-pyrrolidone or 2-pyrrolidone, ureas such as urea, thiourea or tetramethyl urea, allophanates such as allophanate or methylallophanate, biurets such as biuret, dimethylbiuret or tetramethylbiuret, and L-ascorbic acid and salts thereof.

Examples of preservatives and antifungal agents include sodium benzoate, sodium pentachlorophenol, sodium 2-pyridinethiol-1-oxide, sodium sorbate, sodium dehydroacetate and 1,2-dibenzisothiazolin-3-one (Proxel CRL, Proxel BDN, Proxel GXL, Proxel XL-2 or Proxel TN (trade names) manufactured by Avecia Biologics Ltd.).

These components can be used alone or a plurality of types within and between each group can be selected and mixed.

In the ink composition of the present invention, the amounts of all components of the ink composition are preferably selected so that the viscosity of the ink composition is less than 10 mPa·s at 20° C.

In addition, the surface tension of the ink composition of the present invention at 20° C. is preferably 45 mN/m or less, and more preferably within the range of 25 to 45 mN/m.

Moreover, the pH of the ink composition of the present invention at 20° C. is preferably adjusted to be within the range of 8.0 to 10.5.

An example of a method for preparing the ink composition of the present invention consists of adequate mixing and dissolving each component and filtering under pressure with a membrane filter having a pore size of 0.8 μm followed by subjecting to degassing treatment using a vacuum pump.

Although the ink composition of the present invention can be preferably used in ordinary writing instruments such as pens, recorders, pen plotters and stamps, it can be more preferably used as an ink composition for inkjet recording.

This inkjet recording method is a method comprised of discharging an ink composition from a micronozzle in the form of droplets, and causing the droplets to adhere to a recording medium. Examples of such methods include: (1) an electrostatic attraction method (a recording method in which a strong magnetic field is applied between a nozzle and acceleration electrodes placed in front of the nozzle, and a printing data signal is imparted to deflecting electrodes during the time ink droplets jetted from the nozzle fly between the deflecting electrodes, or a method for jetting ink droplets according to a printing data signal without deflecting the droplets), (2) a method in which pressure is applied to ink droplets by a small pump, and a nozzle is mechanically vibrated by a crystal oscillator and the like to forcibly jet ink droplets (recording method in which jetted ink droplets are charged simultaneous to jetting, and a printing data signal is imparted to deflecting electrodes during the time the ink droplets are jetted between the deflecting electrodes), (3) a method using a piezoelectric device (method in which ink droplets are jetted and recorded by applying pressure to the ink droplets with a piezoelectric device simultaneous to application of a printing data signal), and (4) a method in which ink droplets are made to undergo sudden volumetric expansion by the action of thermal energy (method in which ink droplets are jetted and recorded by heating and foaming with microelectrodes in accordance with a printing data signal).

The ink composition of the present invention is preferably used by housing in an ink cartridge either independently or integrally for each color.

Examples of recording media in the present invention include, but are not limited to, paper (Xerox P (trade name: Fuji Xerox Co., Ltd.), Xerox 4024 (trade name: Xerox Co., USA), or Crispia Photo Paper <Gloss> (trade name: Seiko Epson Corp.). In addition, recording media in the case of printing photographic images preferably has a gloss value of 30 or more as measured at a measurement angle of 600 using a glossimeter in compliance with JIS Z 8741.

In the case of a dedicated inkjet recording medium in the form of Crispia Photo Paper <Gloss>: type KA420SCK (Seiko Epson Corp.) in particular, the gloss value is preferably 63 as measured at a measurement angle of 600 using a glossimeter in compliance with JIS Z 8741 (PG-1M: Nippon Denshoku Industries Co., Ltd.).

A recorded article of the present invention is that on which recording has been carried out according to the inkjet recording method described above using the ink composition employing the above-mentioned configuration, and the use of the ink composition of the present invention allows the obtaining of recorded articles having satisfactory printing quality.

The following provides a more detailed explanation of the present invention through examples and comparative examples thereof. Furthermore, the present invention is not limited in any way to the materials, compositions and production methods described in the following examples.

Preparation of Ink Composition

After stirring each of the components for 1 hour at room temperature at the mixing ratios shown in Tables 1 to 4, the mixtures were filtered with a 0.8 μm membrane filter to obtain each of the ink compositions having the compositions shown in Tables 1 to 3. Furthermore, the amounts of each component indicated in the tables is represented as the percent by weight (% by weight) of each component based on the total weight of the ink composition.

A lithium salt of the compound represented by the following formula 3 was used in the examples and comparative example as an example of a compound made to contain lithium ions in the ink in which the counter ions of the colorant are lithium ions. In addition, lithium hydroxide monohydrate was used as an additive in the form of a neutralizer (pH adjuster) of naphthalene carboxylic acid added as an alleviative or inhibitor of bronzing phenomena.

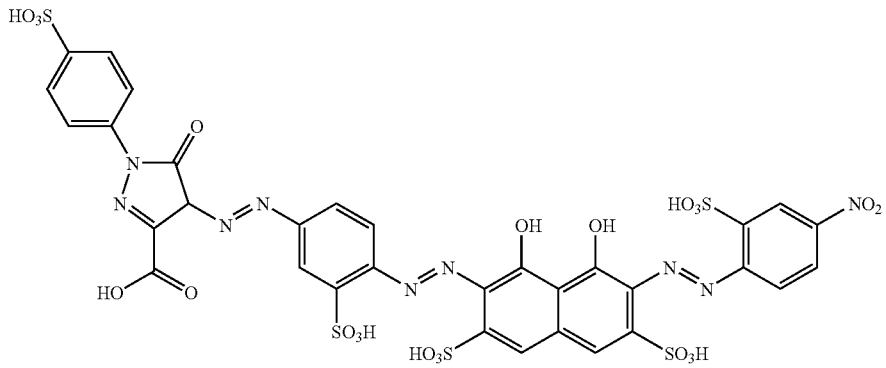

C1

TABLE 1

| | | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| Colorant | Li salt of compound represented by formula 3 | 5 | 5 | 5 | 5 | 3 | 7.5 | 0 | 0 | 0 |
| | C.I. Food Black 2 | 0 | 0 | 0 | 0 | 0 | 0 | 0 | 0 | 0 |
| | C.I. Direct Blue 199*[1] | 0 | 0 | 0 | 0 | 0 | 0 | 2 | 2 | 2 |
| Organic solvent | Triethylene glycol monobutyl ether | 7 | 7 | 7 | 8.5 | 8.5 | 9 | 7.5 | 7.5 | 7.5 |
| | 1,2-hexanediol | | | | | | | | | |
| | Glycerin | 10 | 10 | 10 | 10 | 10 | 0 | 10 | 10 | 10 |
| | Triethylene glycol | 5 | 5 | 5 | 5 | 5 | 5 | 5 | 5 | 5 |
| | 2-pyrrolidone | 2 | 2 | 2 | 2 | 2 | 2 | 2 | 2 | 2 |
| | Diethylene glycol monomethyl ether | | | | | | | | | |
| | Diethylene glycol monobutyl ether | | | | | | | | | |
| | Tetraethylene glycol mono-2-ethyl hexyl ether | 3 | | | | | | | 2.5 | |
| | Hexaethylene glycol mono-2-ethyl hexyl ether | | 3 | | 2 | 2 | 5 | | 2.5 | |
| | Octaethylene glycol mono-2-ethyl hexyl ether | | | 3 | | | | | | 2.5 |
| | Ethylene glycol monooctyl ether | | | | | | | | | |
| Alkali | Triethanolamine | 0.4 | 0.4 | 0.4 | 0.4 | 0.4 | 0.4 | 0.9 | 0.9 | 0.9 |
| Surfactant | Olefin E1010*[2] | 0.8 | 0.8 | 0.8 | 0.8 | 0.8 | 0.8 | 0.8 | 0.8 | 0.8 |
| | Saffinol 104PG50*[2] | | | | | | | | | |
| Additive | 2-naphthoeic acid | 0 | 0 | 0 | 0 | 0 | 0 | 3 | 3 | 3 |
| | 6-hydroxy-2-naphthoeic acid | | | | | | | | | |
| Neutralizer | Lithium hydroxide monohydrate | 0 | 0 | 0 | 0 | 0 | 0 | 0.75 | 0.75 | 0.75 |
| Rust inhibitor | Benzotriazole | 0.01 | 0.01 | 0.01 | 0.01 | 0.01 | 0.01 | 0.01 | 0.01 | 0.01 |
| Preservative | Proxel XL-2*[3] | 0.3 | 0.3 | 0.3 | 0.3 | 0.3 | 0.3 | 0.3 | 0.3 | 0.3 |
| Chelating agent | Ethylenediamine tetraacetic acid | 0.02 | 0.02 | 0.02 | 0.02 | 0.02 | 0.02 | 0.02 | 0.02 | 0.02 |
| Other | Ultrapure water | 66.47 | 66.47 | 66.47 | 65.97 | 67.97 | 59.97 | 65.22 | 65.22 | 65.22 |
| Total | | 100 | 100 | 100 | 100 | 100 | 100 | 100 | 100 | 100 |

Units: % by weight
*[1]Having the spectral characteristics indicated in FIG. 1.
*[2]Manufactured by Air Products Japan, Inc.
*[3]Manufactured by Arch Chemicals Japan, Inc.

TABLE 2

|  |  | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|---|
| Colorant | Li salt of compound represented by formula 3 | 0 | 0 | 0 | 0 | 0 | 0 | 0 | 0 | 0 |
|  | C.I. Food Black 2 | 0 | 0 | 0 | 0 | 0 | 0 | 0 | 0 | 0 |
|  | C.I. Direct Blue 199*[1] | 2 | 1 | 4 | 2 | 2 | 2 | 2 | 2 | 1 |
| Organic solvent | Triethylene glycol monobutyl ether | 8.5 | 8.5 | 9 | 7.5 | 7.5 | 7.5 | 0 | 0 | 8 |
|  | 1,2-hexanediol |  |  |  |  |  |  |  |  |  |
|  | Glycerin | 10 | 10 | 10 | 10 | 10 | 10 | 10 | 10 | 10 |
|  | Triethylene glycol | 5 | 5 | 5 | 5 | 5 | 5 | 5 | 5 | 3 |
|  | 2-pyrrolidone | 2 | 2 | 2 | 2 | 2 | 2 | 2 | 2 | 1 |
|  | Diethylene glycol monomethyl ether |  |  |  |  |  |  |  |  |  |
|  | Diethylene glycol monobutyl ether |  |  |  |  |  |  |  |  |  |
|  | Tetraethylene glycol mono-2-ethyl hexyl ether |  |  |  | 1.25 | 1.25 |  | 1.25 | 5 |  |
|  | Hexaethylene glycol mono-2-ethyl hexyl ether | 1.5 | 1.5 | 4 | 1.25 |  | 1.25 | 1.25 | 5 | 3.5 |
|  | Octaethylene glycol mono-2-ethyl hexyl ether |  |  |  |  | 1.25 | 1.25 |  |  |  |
|  | Ethylene glycol monooctyl ether |  |  |  |  |  |  |  |  |  |
| Alkali | Triethanolamine | 0.9 | 0.9 | 0.9 | 0.9 | 0.9 | 0.9 | 0.9 | 0.9 | 0.5 |
| Surfactant | Olefin E1010*[2] | 0.8 | 0.8 | 0.8 | 0.8 | 0.8 | 0.8 | 0.8 | 0.8 |  |
|  | Saffinol 104PG50*[2] |  |  |  |  |  |  |  |  | 0.5 |
| Additive | 2-naphthoeic acid | 3 | 1.5 | 5 | 3 | 3 | 3 | 3 | 3 |  |
|  | 6-hydroxy-2-naphthoeic acid |  |  |  |  |  |  |  |  | 3 |
| Neutralizer | Lithium hydroxide monohydrate | 0.75 | 0.38 | 1.25 | 0.75 | 0.75 | 0.75 | 0.75 | 0.75 | 0.67 |
| Rust inhibitor | Benzotriazole | 0.01 | 0.01 | 0.01 | 0.01 | 0.01 | 0.01 | 0.01 | 0.01 |  |
| Preservative | Proxel XL-2*[3] | 0.3 | 0.3 | 0.3 | 0.3 | 0.3 | 0.3 | 0.3 | 0.3 | 0.3 |
| Chelating agent | Ethylenediamine tetraacetic acid | 0.02 | 0.02 | 0.02 | 0.02 | 0.02 | 0.02 | 0.02 | 0.02 |  |
| Other | Ultrapure water | 65.22 | 68.09 | 57.72 | 65.22 | 65.22 | 65.22 | 72.72 | 65.22 | 68.53 |
| Total |  | 100 | 100 | 100 | 100 | 100 | 100 | 100 | 100 | 100 |

Units: % by weight
*[1]Having the spectral characteristics indicated in FIG. 1.
*[2]Manufactured by Air Products Japan, Inc.
*[3]Manufactured by Arch Chemicals Japan, Inc.

TABLE 3

|  |  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 | Comp. Ex. 11 |
|---|---|---|---|---|---|---|---|---|---|---|---|---|
| Colorant | Li salt of compound represented by formula 3 | 0 | 5 | 5 | 5 | 0 | 0 | 0 | 0 | 0 | 0 | 0 |
|  | C.I. Food Black 2 | 4 | 0 | 0 | 0 | 0 | 0 | 0 | 0 | 0 | 0 | 0 |
|  | C.I. Direct Blue 199*[1] | 0 | 0 | 0 | 0 | 2 | 2 | 2 | 2 | 2 | 1 | 2 |

TABLE 3-continued

| | | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 | Comp. Ex. 11 |
|---|---|---|---|---|---|---|---|---|---|---|---|---|
| Organic solvent | Triethylene glycol monobutyl ether | 10 | 7 | 7 | 7 | 10 | 10 | 7.5 | 7.5 | 7.5 | 8 | 8 |
| | 1,2-hexanediol | | | | | | | | | | 3 | 2 |
| | Glycerin | 10 | 10 | 10 | 10 | 10 | 10 | 10 | 10 | 10 | 10 | 10 |
| | Triethylene glycol | 5 | 5 | 5 | 5 | 5 | 5 | 5 | 5 | 5 | 3 | 5 |
| | 2-pyrrolidone | 2 | 2 | 2 | 2 | 2 | 2 | 2 | 2 | 2 | 1 | 2 |
| | Diethylene glycol monomethyl ether | | 3 | | | | | 2.5 | | | | |
| | Diethylene glycol monobutyl ether | | | 3 | | | | | 2.5 | | | |
| | Tetraethylene glycol mono-2-ethyl hexyl ether | | | | | | | | | | | |
| | Hexaethylene glycol mono-2-ethyl hexyl ether | | | | | | | | | | | |
| | Octaethylene glycol mono-2-ethyl hexyl ether | | | | | | | | | | | |
| | Ethylene glycol monooctyl ether | | | | 3 | | | | | 2.5 | | |
| Alkali | Triethanolamine | 0.4 | 0.4 | 0.4 | 0.4 | 0.9 | 0.9 | 0.9 | 0.9 | 0.9 | 0.5 | 0.9 |
| Surfactant | Olefin E1010*[2] | 0.8 | 0.8 | 0.8 | 0.8 | 0.8 | 0.8 | 0.8 | 0.8 | 0.8 | | 0.8 |
| | Saffinol 104PG50*[2] | | | | | | | | | | 0.5 | |
| | 2-naphthoeic acid | 0 | 0 | 0 | 0 | 0.2 | 3 | 3 | 3 | 3 | | 3 |
| Additive | 6-hydroxy-2-naphthoeic acid | | | | | | | | | | 3 | |
| Neutralizer | Lithium hydroxide monohydrate | 0 | 0 | 0 | 0 | 0.05 | 0.75 | 0.75 | 0.75 | 0.75 | 0.67 | 0.75 |
| Rust inhibitor | Benzotriazole | 0.01 | 0.01 | 0.01 | 0.01 | 0.01 | 0.01 | 0.01 | 0.01 | 0.01 | | 0.01 |
| Preservative | Proxel XL-2*[3] | 0.3 | 0.3 | 0.3 | 0.3 | 0.3 | 0.3 | 0.3 | 0.3 | 0.3 | 0.3 | 0.3 |
| Chelating agent | Ethylene diamine tetraacetic acid | 0.02 | 0.02 | 0.02 | 0.02 | 0.02 | 0.02 | 0.02 | 0.02 | 0.02 | | 0.02 |
| Other | Ultrapure water | 67.47 | 66.47 | 66.47 | 66.47 | 68.72 | 65.22 | 65.22 | 65.22 | 65.22 | 69.03 | 65.22 |
| Total | | 100 | 100 | 100 | 100 | 100 | 100 | 100 | 100 | 100 | 100 | 100 |

Units: % by weight
*[1]Having the spectral characteristics indicated in FIG. 1.
*[2]Manufactured by Air Products Japan, Inc.
*[3]Manufactured by Arch Chemicals Japan, Inc.

The following tests were carried out on these ink compositions. The results are shown in Table 4.

However, since separation of the contents occurred during production of the ink compositions of Comparative Example 4 and Comparative Example 9, evaluations were unable to be carried out due to being unable to obtain a homogeneous ink.

Material Resistance Test

A plate measuring 30 mm×40 mm×2 mm made from the same material as the plastic material used for the ink cartridge (polypropylene resin containing 1.4224% by weight of higher fatty acid in the form of stearic acid) was produced, and this was sealed after placing in a Teflon (registered trademark) container containing 10 g of the ink composition so that four plates were not superimposed on each other followed by allowing the container to stand for 6 days in an environment at 70° C. Subsequently, the container was cooled for 3 days in an environment at 0° C. followed by filtering out any precipitate from the ink composition in the container with a 10 µm metal filter. Material resistance was evaluated based on the judgment criteria listed below according to the amount of foreign substance that collected on the metal filter and the filtration status:

A: no foreign substance collected on the filter;
B: slight amount of foreign substance collected on filter, but entire amount of ink able to be filtered;
C: some foreign substance collected on filter, but entire amount of ink able to be filtered;
D: considerable amount of foreign substance collected on filter, but entire amount of ink able to be filtered; and
E: large accumulation of foreign substance that caused clogging and prevented all of the ink from being filtered.

Bronzing Resistance Test

A printing test was carried out using the PM-A700 Inkjet Printer (trade name: Seiko Epson Corp.). The ink compositions of Examples 7 to 18 and Comparative Examples 5 to 8, 10 and 11 were respectively filled into a dedicated cyan cartridge for use with this printer.

This cartridge was installed in the printer and printed articles were obtained by solid printing onto Crispia Photo Paper <Gloss>, type KA420SCK (Seiko Epson Corp.) at an injection volume of 1.5 to 2.2 mg per square inch in an environment at 25° C. and 50% RH.

The gloss values of the printed articles and recording media were respectively determined for the resulting printed articles by measuring using a glossimeter (PG-1M: Nippon Denshoku Industries Co., Ltd.) at a measurement angle of 60°.

Bronzing resistance was evaluated based on the judgment criteria listed below from the calculated values obtained by subtracting the gloss values of the recording media from the gloss values of the printed articles.

A: Less than 15
B: 15 to less than 35
C: 35 to less than 55
D: 55 or more

In addition, the ink compositions of Examples 1 to 6 and Comparative Examples 1 to 3 were respectively filled into a dedicated black cartridge for use with the PM-A700 Inkjet Printer, and printed using the same printer onto a dedicated inkjet recording medium (Crispia Photo Paper <Gloss>, type KA420SCK (Seiko Epson Corp.)) after adjusting each ink composition so that the optical density (OD) value was within the range of 0.9 to 1.1. The printed articles were then allowed to stand for 1 day in an environment at normal temperature and humidity while protected from direct sunlight to obtain recorded articles used for evaluation.

Light Resistance Test

The black recorded articles described above were exposed for 21 days under conditions consisting of a temperature of 24° C., relative humidity of 60% RH and luminosity of 70,000 lux using the above-mentioned recorded articles and an STF-II Fluorescent Lamp Weather Resistance Tester (trade name: Suga Test Instruments Co., Ltd.).

Following exposure, the OD value of each recorded article was measured using a reflection densitometer (Spectrolino (trade name: Gretag Ltd.)), and the recorded articles were evaluated based on the judgment criteria listed below by determining the residual optical density (ROD) from the following equation:

$$ROD(\%) = (D/D_0) \times 100$$

D: OD after exposure test; and
$D_0$: OD before exposure test;
(with measuring conditions consisting of a D50 light source and an angle of 2 degrees for the view angle).

A: ROD of 80% or more
B: ROD of 60% to less than 80%
C: ROD of 40% to less than 60%
D: ROD of less than 40%

Ozone Resistance Test

The same recorded articles used in the light resistance test were prepared, and then exposed for 12 hours under conditions consisting of a temperature of 24° C., relative humidity of 60% RH and ozone concentration of 10 ppm using a Model OMS-H Ozone Weather Meter (trade name, Suga Test Instruments Co., Ltd.).

Following exposure, the OD value of each recorded article was measured using the same type of reflection densitometer as that used in the light resistance test and under the same conditions as the light resistance test, and the recorded articles were evaluated based on the judgment criteria listed below by determining the residual optical density (ROD) from the same equation used in the light resistance test.

A: ROD of 80% or more
B: ROD of 60% to less than 80%
C: ROD of 40% to less than 60%
D: ROD of less than 40%

Bleeding Test

A printing test was carried out using the PM-A700 Inkjet Printer (trade name: Seiko Epson Corp.). The ink compositions of Examples 7 to 18 were respectively filled into a dedicated cyan cartridge for use with the printer.

This cartridge was installed the printer and printing was carried out in an alternating manner so that yellow ink and cyan ink were adjacent to each other onto Crispia Photo Paper <Gloss>, type KA420SCK (Seiko Epson Corp.) in an environment at 24° C. and 60% RH. The printing quality at the borders thereof was confirmed visually and bleeding was evaluated based on the judgment criteria listed below.

A: Sharp borders remained
B: Some disruption at borders but ink confirmed to be mixed
C: Original borders unable to be confirmed Liquid Contactability Test A printing test was carried out using the PM-A700 Inkjet Printer (trade name: Seiko Epson Corp.). The ink compositions of Examples 7 to 18 were respectively filled into a dedicated cyan cartridge for use with the printer.

This cartridge was installed the printer and allowed to stand in a constant temperature chamber for 2 weeks in an environment at 50° C. Following completion of standing, the print head was removed from the printer after cooling to room temperature, appearance was observed with respect to those portions joined with adhesive, and liquid contactability was evaluated based on the judgment criteria listed below.

A: No swelling of adhesive observed
B: Swelling of adhesive confirmed but no particular problems with respect to adhesive strength
C: Swelling of adhesive confirmed along with decrease in adhesive strength Ink Droplet Jetting Stability Test A printing test was carried out using the PM-A700 Inkjet Printer (trade name: Seiko Epson Corp.). The ink compositions of Examples 1 to 18 were respectively filled into a dedicated cartridge for use with the printer, and ink droplets were recorded onto a recorded article while changing the flight speed of the droplets by changing the distortion ratio of a piezoelectric device (using a small dot waveform in an environment at 25° C.).

Here, the maximum flight speed of ink droplets that do not form three or more droplets due to separation of the ink either at the start of flight or during flight of the ink droplets is defined as the maximum stable flight speed (m/s), while the minimum flight speed of the ink droplets at which the ink droplets are able to accurately land on the printed article without decelerating is similarly defined as the minimum stable flight speed (m/s). The difference between the maximum stable flight speed and the minimum stable flight speed is defined as the stable range, and the flight stability of the ink droplets was evaluated based on the judgment criteria listed below.

A: Stable range of 9 or more
B: Stable range of 8 to less than 9
C: Stable range of 7 to less than 8
D: Stable range of less than 7

TABLE 4

|  | Ex. 1 | Ex. 2 | Ex. 3 | Ex. 4 | Ex. 5 | Ex. 6 | Ex. 7 | Ex. 8 | Ex. 9 |
| --- | --- | --- | --- | --- | --- | --- | --- | --- | --- |
| Material resistance | A | A | C | B | A | A | A | A | C |
| Liquid contactability |  |  |  |  |  |  | A | A | A |
| Bleeding |  |  |  |  |  |  | A | A | A |
| Bronzing resistance |  |  |  |  |  |  | A | A | A |
| Ink droplet flight stability | A | A | A | A | A | A | A | A | A |
| Light resistance | A | A | A | A | A | A |  |  |  |
| Ozone resistance | A | A | A | A | A | A |  |  |  |

|  | Ex. 10 | Ex. 11 | Ex. 12 | Ex. 13 | Ex. 14 | Ex. 15 | Ex. 16 | Ex. 17 | Ex. 18 |
| --- | --- | --- | --- | --- | --- | --- | --- | --- | --- |
| Material resistance | B | A | A | A | B | B | A | A | A |
| Liquid contactability | A | A | A | A | A | A | A | B | A |
| Bleeding | A | A | A | A | A | A | B | A | A |
| Bronzing resistance | A | A | A | A | A | A | A | A | A |
| Ink droplet flight stability | A | A | A | A | A | A | A | A | A |
| Light resistance |  |  |  |  |  |  |  |  |  |
| Ozone resistance |  |  |  |  |  |  |  |  |  |

|  | Comp. Ex. 1 | Comp. Ex. 2 | Comp. Ex. 3 | Comp. Ex. 4 | Comp. Ex. 5 | Comp. Ex. 6 |
| --- | --- | --- | --- | --- | --- | --- |
| Material resistance | A | E | E | Unable to evaluate | B | D |
| Bronzing resistance |  |  |  | Unable to evaluate | D | A |
| Light resistance | D | A | A | Unable to evaluate |  |  |
| Ozone resistance | D | A | A | Unable to evaluate |  |  |

|  | Comp. Ex. 7 | Comp. Ex. 8 | Comp. Ex. 9 | Comp. Ex. 10 | Comp. Ex. 11 |
| --- | --- | --- | --- | --- | --- |
| Material resistance | D | D | Unable to evaluate | D | D |
| Bronzing resistance | A | A | Unable to evaluate | A | A |
| Light resistance |  |  | Unable to evaluate |  |  |
| Ozone resistance |  |  | Unable to evaluate |  |  |

As is clear from Tables 1 to 4, an ink composition of the present invention incorporating a specific glycol ether as represented by formula 1 is able to effectively inhibit precipitation of salts insoluble or poorly soluble in water and organic solvents that occurs as a result of fatty acids, which elute from a plastic member when in contact with such as plastic member for an extended period of time at a high temperature of 70° C., bonding with lithium ions contained in the ink composition at a concentration of 0.01% by weight or more. On the other hand, in ink compositions of the comparative examples that do not incorporate a glycol ether represented by formula 1, various problems were observed, including separation of contents and precipitation of foreign substances as previously described.

In addition, in the case of Examples 16 and 17, which used only the glycol ether represented by formula 1, Example 16, which contained the glycol ether represented by general formula 1 at a total of 2.5% by weight of the entire ink composition, demonstrated a slight decrease in bleeding although it was extremely superior in terms of inhibiting precipitation of poorly soluble salts and liquid contactability, while Example 17, which contained the glycol ether represented by formula 1, at a total of 10% by weight in the entire ink composition, demonstrated slight decrease in liquid contactability although it was extremely superior in terms of inhibiting precipitation of poorly soluble salts and bleeding. In contrast, Examples 7 to 15 and Example 18, which combined the use of the glycol ether represented by formula 1 with another glycol ether, were determined to demonstrate extremely superior effects in terms of inhibiting precipitation of poorly soluble salts, bleeding and liquid contactability.

What is claimed is:

1. An ink composition at least comprising water and a colorant, and further comprising 0.01% by weight or more of lithium ions based on the total weight of the ink composition and at least one type of glycol ether represented by the following formula 1, wherein the weight ratio of lithium ions to the glycol ether represented by formula 1 is 1:10 to 1:30:

$$R_1O—[—CH_2—CH_2—O]_n—R_2 \quad \text{Formula 1}$$

wherein, n represents a positive number of 4 to 8, $R_1$ represents H or an alkyl group having 1 to 3 carbon atoms, and $R_2$ represents an alkyl group having 6 to 8 carbon atoms.

2. The ink composition according to claim 1, wherein the weight ratio of lithium ions to the glycol ether represented by formula 1 is 1:15 to 1:30.

3. The ink composition according to claim 1, wherein the glycol ether represented by formula 1 is such that in formula 1, $R_2$ represents an alkyl group having eight carbon atoms.

4. The ink composition according to claim 1, wherein the glycol ether represented by formula 1 is tetraethylene glycol mono-2-ethyl hexyl ether, hexaethylene glycol mono-2-ethyl hexyl ether or octaethylene glycol mono-2-ethyl hexyl ether.

5. The ink composition according to claim 1, wherein the content of the glycol ether represented by formula 1 is 0.2 to 10% by weight of the entire ink composition.

6. The ink composition according to claim 5, wherein the content of the glycol ether is 0.2 to 6% by weight.

7. The ink composition according to claim 1, further containing a glycol ether other than the glycol ether represented by formula 1.

8. The ink composition according to claim 1, wherein the total content of glycol ether is 6 to 15% by weight of the entire ink composition.

9. The ink composition according to claim 7, wherein the content of the glycol ether represented by formula 1 is 5 to 40% by weight of all glycol ethers.

10. A recorded article recorded using the ink composition according to claim 1.

11. An ink contact member, housing the ink composition according to claim 1, wherein the ink contact member comprises a resin and at least one fatty acid.

12. The ink composition according to claim 1, wherein the glycol ether represented by formula 1 inhibits precipitation of lithium salts when the ink composition is in contact with a fatty acid.

13. An ink composition in contact with at least one fatty acid, the ink composition comprising water and a colorant, and further comprising about 0.01% by weight or more of lithium ions based on the total weight of the ink composition and at least one type of glycol ether represented by the following formula 1:

$$R_1O—[—CH_2—CH_2—O]_n—R_2 \quad \text{Formula 1}$$

wherein, n represents a positive number of 4 to 8, $R_1$ represents H or an alkyl group having 1 to 3 carbon atoms, and $R_2$ represents an alkyl group having 6 to 8 carbon atoms and wherein the lithium ions are soluble in the presence of the at least one fatty acid.

14. The ink composition according to claim 13, wherein the content of the glycol ether represented by formula 1 is about 0.2 to about 10% by weight of the entire ink composition.

15. The ink composition according to claim 13, wherein the total content of glycol ether is about 6 to about 15% by weight of the entire ink composition.

* * * * *